(12) United States Patent
Ishihara

(10) Patent No.: US 11,703,486 B2
(45) Date of Patent: Jul. 18, 2023

(54) COLUMN OVEN

(71) Applicant: SHIMADZU CORPORATION, Kyoto (JP)

(72) Inventor: Hikaru Ishihara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 605 days.

(21) Appl. No.: 16/634,143

(22) PCT Filed: Sep. 21, 2017

(86) PCT No.: PCT/JP2017/034034
§ 371 (c)(1),
(2) Date: Jan. 25, 2020

(87) PCT Pub. No.: WO2019/058476
PCT Pub. Date: Mar. 28, 2019

(65) Prior Publication Data
US 2020/0209200 A1     Jul. 2, 2020

(51) Int. Cl.
*G01N 30/54* (2006.01)
*G01N 30/30* (2006.01)
*G01N 30/52* (2006.01)

(52) U.S. Cl.
CPC ..... *G01N 30/54* (2013.01); *G01N 2030/3084* (2013.01); *G01N 2030/521* (2013.01); *G01N 2030/524* (2013.01)

(58) Field of Classification Search
CPC .................. G01N 30/54; G01N 2030/3084
See application file for complete search history.

(56) References Cited

U.S. PATENT DOCUMENTS 3,522,725 A * 8/1970 Waters .................... G01N 30/30
73/61.57
4,420,679 A * 12/1983 Howe .................... G01N 30/30
219/400

(Continued)

FOREIGN PATENT DOCUMENTS

CN     204649701 U    9/2015
CN     106168613 A   11/2016

(Continued)

OTHER PUBLICATIONS

Office Action for corresponding CN Application No. 201780092401.6 dated Jan. 12, 2022, with English language translation.

(Continued)

*Primary Examiner* — Paul M. West
(74) *Attorney, Agent, or Firm* — Renner, Otto, Boisselle & Sklar, LLP

(57) ABSTRACT

A column oven includes a substantially sealed space surrounded by wall surfaces made of a heat conductive material to accommodate an analytical column, a heater for heating the wall surfaces made of the heat conductive material, and a heat insulating material surrounding an outside of the wall surfaces made of the heat conductive material. That is, a space inside the column oven in which the analytical column is accommodated is formed as a substantially sealed structure surrounded by the heat conductive wall surfaces, and the wall surfaces surrounding the substantially sealed space are heated by the heater, thereby heating the substantially sealed space uniformly from circumferential directions.

7 Claims, 2 Drawing Sheets

(56) References Cited

U.S. PATENT DOCUMENTS 4,869,876 A * 9/1989 Arfman .................. G01N 30/30
422/89
2011/0290233 A1 12/2011 Iso

FOREIGN PATENT DOCUMENTS

| JP | 5889788 | * | 5/1983 | ............ G01N 30/30 |
| JP | H07-275719 A | | 10/1995 | |
| JP | 2011-252719 A | | 2/2006 | |
| JP | 2014-157139 A | | 8/2014 | |
| JP | 2016-217912 A | | 12/2016 | |

OTHER PUBLICATIONS

International Search Report for corresponding Application No. PCT/JP2017/034034, dated Dec. 19, 2017.
Written Opinion for corresponding Application No. PCT/JP2017/034034, dated Dec. 19, 2017.
Office Action for corresponding CN Application No. 201780092401.6 dated Mar. 10, 2022, with English language translation.
Office Action for corresponding CN Application No. 201780092401.6 dated Aug. 2, 2021, with English language translation.
Office Action for corresponding CN Application No. 201780092401.6 dated May 31, 2022, with English language translation.

* cited by examiner

COLUMN OVEN

TECHNICAL FIELD

The present invention relates to a column oven for adjusting a temperature of an analytical column for a liquid chromatograph.

BACKGROUND ART

Analysis by liquid chromatography is performed by delivering a mobile phase in an analysis channel, transporting a sample injected into the analysis channel to an analytical column and separating the sample, and detecting components separated in the analytical column by a detector. As the analytical column for separating a sample, a capillary filled with filler is generally used. Since resolution of the analytical column is temperature-dependent, when the temperature of the analytical column varies, a retention time of sample components changes, and reproducibility of analytical results deteriorates. For this reason, the analytical column is accommodated in a temperature control device called a column oven to adjust the temperature.

The column oven holds the analytical column with a heat conductive heat block in a space surrounded by a heat insulating material, and heat is transferred from the heat block to the analytical column by heating the heat block, so as to adjust the temperature of the analytical column (see Patent Document 1).

PRIOR ART DOCUMENT

Patent Document

Patent Document 1: Japanese Patent Laid-open Publication No. 2011-252719

SUMMARY OF THE INVENTION

Problems to be Solved by the Invention

Incidentally, the column oven is provided with an openable cover. To set the analytical column in the column oven, it is necessary to perform operations such as opening the openable cover of the column oven, holding the analytical column in the heat block in a column oven main body, connecting piping that communicates to an autosampler and a detector to both ends of the analytical column, and thereafter closing the openable cover. Among these operations, the operation of connecting the piping to the analytical column set in the column oven is particularly complicated, and thus, to provide in the column oven a mechanism that facilitates attachment and detachment of the piping to the analytical column has also been proposed.

In order to provide such a mechanism in the column oven, a certain amount of space is required in the column oven. The space in the column oven that is opened and closed by the openable cover is not inherently a sufficiently sealed space. In addition, if the space in the column oven is large, followability of the temperature in the space in the column oven with respect to the heat block temperature is deteriorated, and it becomes difficult to control the temperature of the analytical column uniformly and accurately.

Accordingly, an object of the present invention is to improve an internal structure of the column oven so that temperature control of the analytical column can be uniformly and accurately performed even when a large internal space is provided.

Solutions to the Problems

A column oven according to the present invention includes a substantially sealed space surrounded by wall surfaces made of a heat conductive material to accommodate an analytical column, a heater for heating the wall surfaces made of the heat conductive material, and a heat insulating material surrounding an outside of the wall surfaces made of the heat conductive material. That is, in the present invention, a space inside the column oven in which the analytical column is accommodated is formed as a substantially sealed structure surrounded by the heat conductive wall surfaces, and the wall surfaces surrounding the substantially sealed space are heated by the heater, thereby heating the substantially sealed space uniformly from circumferential directions.

In a preferred embodiment, the column oven includes an openable cover and a column oven main body that has an openable surface that is opened and closed by the openable cover. In this case, the column oven main body has a recess that opens on the opening surface side so that the analytical column is inserted into the recess from the opening surface side and is held in the recess, inner wall surfaces of the recess are constituted of the heat conductive material, the openable cover includes a heat transfer plate constituted of the heat conductive material on a surface opposing the openable surface of the column oven main body, and when the openable cover closes the openable surface of the column oven main body, the heat transfer plate seals the opening by coming into contact with an edge, constituted of the heat conductive material, of the opening of the recess so that the substantially sealed space is formed.

In a further preferred embodiment, the analytical column is held by a column holder provided in the recess and is made of a heat conductive material, the column oven is configured so that heat of the heater is directly transferred from the inner wall surfaces of the recess to the analytical column through the column holder, and the column oven is configured so that he analytical column is heated by convection of heat in the substantially sealed space by being transferred the heat of the heater from the inner wall surfaces of the recess to the heat transfer plate.

In the above case, the openable cover preferably has an elastic member keeping to press the heat transfer plate toward the openable surface. Thus, the heat transfer plate is pressed against the edge of the opening of the recess of the column oven main body, sealing property of the substantially sealed space formed by the recess and the heat transfer plate is increased, and hence responsiveness to temperature control in the substantially sealed space is improved.

One end of the openable cover may be linked with the column oven main body by a hinge. Thus, the openable cover does not drop from the column oven main body, and handling of the openable cover when the analytical column is attached to or detached from the column oven becomes easy.

Effects of the Invention

In a column oven according to the present invention, a space inside the column oven in which an analytical column is accommodated is formed as a substantially sealed structure surrounded by heat conductive wall surfaces, and the wall surfaces surrounding a substantially sealed space is heated by a heater, thereby transferring heat from the heater to the entire substantially sealed space uniformly. Thus, responsiveness to temperature control in the space in which the analytical column is accommodated is improved. The temperature of an analytical column can thereby be performed accurately and uniformly.

EMBODIMENT OF THE INVENTION

Hereinafter, an embodiment of a column oven according to the present invention will be described with reference to FIGS. 1 and 2.

Figure 1:
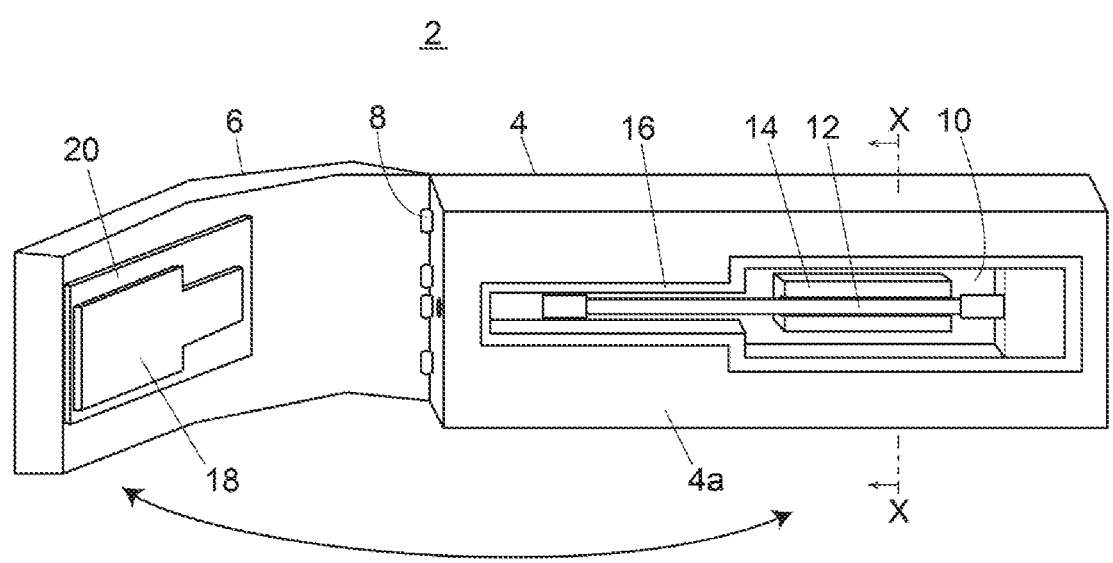
FIG. 1 is a perspective view illustrating a state that an openable cover of a column oven of one embodiment is opened.

As illustrated in FIG. 1, a column oven 2 includes a column oven main body 4 and an openable cover 6. The openable cover 6 has a base end linked with one end of the column oven main body 4 by a hinge 8 and can open and close an openable surface 4a of the column oven main body 4.

The column oven main body 4 includes a recess 10 having an opening in the openable surface 4a. The recess 10 is for inserting an analytical column 12 in which a capillary is filled with filler. A column holder 14 for holding the analytical column 12 is provided in the recess 10. Wall surfaces of the recess 10 are constituted of a heat transfer block 16 constituted of a metal material having good thermal conductivity such as aluminum. The column holder 14 is also constituted of a metal material having good thermal conductivity such as aluminum. The heat transfer block 16 is exposed on an edge of the recess 10 of the openable surface 4a of the column oven main body 4.

A heat transfer plate 18 is provided on an inner surface of the openable cover 6, that is, a surface of the openable cover 6 that opposes the openable surface 4a of the column oven main body 4 when the openable cover 6 is closed. The heat transfer plate 18 has a shape corresponding to the recess 10 of the column oven main body 4 and is provided so as to seal the opening of the recess 10 when the openable cover 6 is closed. A heat insulating plate 20 is provided on a back surface of the heat transfer plate 18. Similar to the heat transfer block 16, the heat transfer plate 18 is constituted of a metal having good thermal conductivity such as aluminum. The heat insulating plate 20 is constituted of a heat insulating material such as polyethylene foam (for example, Softlon, which is a product of Sekisui Chemical Co., Ltd.).

Figure 2:
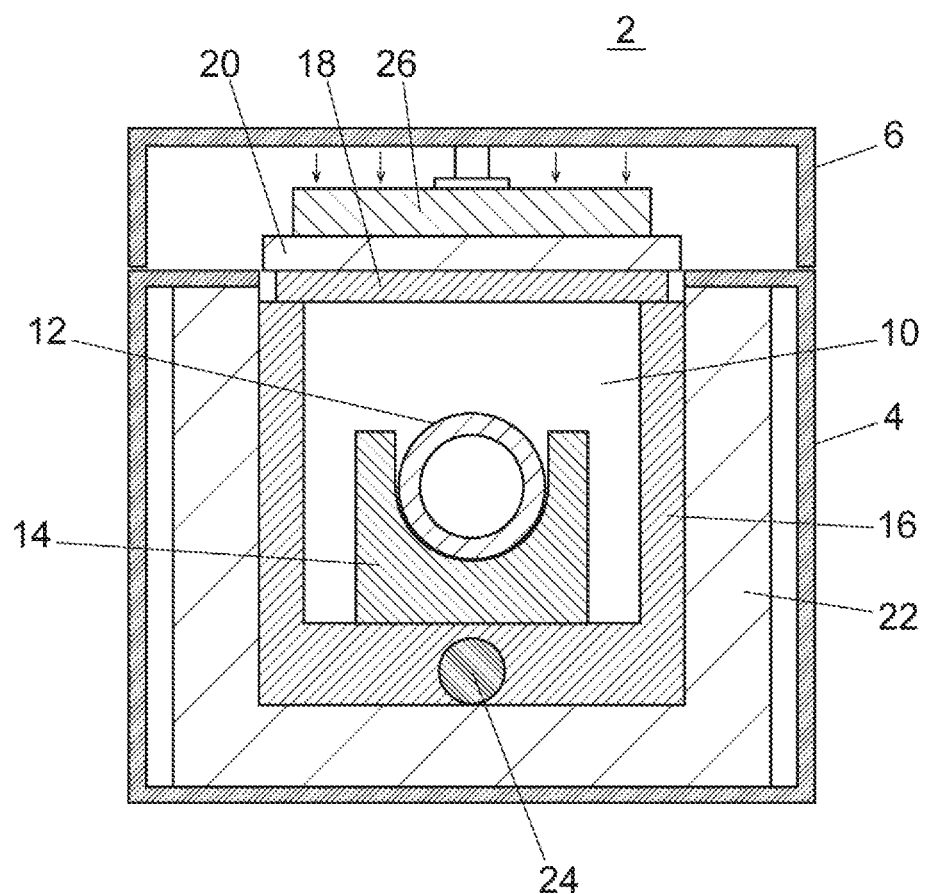
FIG. 2 is a cross-sectional view illustrating an internal structure of the column oven in the same embodiment with the openable cover closed.

As illustrated in FIG. 2, when the openable cover 6 is closed, a peripheral portion of the heat transfer plate 18 provided on the openable cover 6 comes into contact with the heat transfer block 16 exposed at an edge of the recess 10, thereby sealing the opening of the recess 10 with the heat transfer plate 18. Thus, the recess 10 for accommodating the analytical column 12 becomes a substantially sealed space surrounded by wall surfaces made of a heat conductive material.

A heater 24 is embedded in the heat transfer block 16. Heat of the heater 24 is directly transferred to the analytical column 12 through the heat transfer block 16 and the column holder 14. In the present embodiment, the analytical column 12 is fixed to the heat transfer block 16 through the column holder 14, and therefore, compared with a case where the analytical column 12 is brought into direct contact with the heat transfer block 16, heating of the analytical column 12 is insufficient only when heat is transferred directly. However, in the present embodiment, since the heat transfer plate 18 comes into close contact with the heat transfer block 16 to form a substantially sealed space made of a heat transfer material, heat of the heater 24 is also transferred to the heat transfer plate 18 through the heat transfer block 16. Thus, heat from the heater 24 is transferred to all wall surfaces of the substantially sealed space 10 that accommodates the analytical column 12, and the inside of the substantially sealed space 10 is quickly and uniformly heated by convection of heat. As a result, the analytical column 12 disposed in the substantially sealed section can be sufficiently heated to an appropriate temperature by direct heat transfer and heating by convection of heat.

On an outside of the heat transfer block 16, a heat insulating block 22 made of a heat insulating material such as polyethylene foam (for example, Softlon, which is a product of Sekisui Chemical Co., Ltd.) is provided, and the heat insulating plate 20 is also provided on an outside (upper side in FIG. 2) of the heat transfer plate 18. As a result, the substantially sealed space 10 is thermally separated from surroundings of the column oven 2 and is not easily affected by fluctuations in environmental temperatures.

Further, since a surface portion of the openable cover 6 is thermally separated from the heat transfer plate 18 by the heat insulating plate 20, the temperature of the surface portion does not become high due to heat from the heater 24. Thus, when the analytical column 12 is replaced after analysis is completed, a user can safely replace the analytical column 12 without touching a high-temperature part. Further, since a configuration to open and close the openable cover 6 by the hinge 8 is employed, it is possible to prevent dropping of the openable cover 6 upon replacement of the analytical column 12 resulting is damaging the openable cover 6, or injuring or burning an operator.

Further, the heat insulating plate 20 of the openable cover 6 is held by a holding block 26, and the holding block 26 is attached to the openable cover 6 with an elastic member such as a leaf spring interposed therebetween. The elastic member interposed between the openable cover 6 and the holding block 26 is provided so as to generate an elastic force in a direction to keep pressing the heat transfer plate 18 toward the recess 10 when the openable cover 6 is closed, as indicated by an arrow in FIG. 2. Thus, the degree of sealing in the substantially sealed space can be increased, and heating by convection of heat in the substantially sealed space can be appropriately performed.

Note that although not illustrated in FIGS. 1 and 2, a temperature sensor is attached to one of the column holder 14, the heat transfer block 16, or the heat transfer plate 18. An output of the heater 24 is controlled based on a detection signal of the temperature sensor.

DESCRIPTION OF REFERENCE SIGNS

2: Column oven
4: Column oven main body
4a: Openable surface
6: Openable cover
8: Hinge
10: Recess
12: Analytical column
14: Column holder 16: Heat transfer block
18: Heat transfer plate
20: Heat insulating plate
22: Heat insulating block
24: Heater
26: Holding block

The invention claimed is:

1. A column oven comprising:
a substantially sealed space surrounded by wall surfaces made of a heat conductive material to accommodate an analytical column, all of the wall surfaces made of the heat conductive material coming into contact with each other;
a column holder provided in the substantially sealed space while being in thermal contact with one wall surface of the wall surfaces and configured to hold the analytical column by being in thermal contact with the analytical column, and a whole of the column holder being made of a heat conductive material,
a heater for heating the wall surfaces made of the heat conductive material while coming into contact with the wall surfaces; and
a heat insulating material surrounding an outside of the wall surfaces made of the heat conductive material, wherein
the column oven is configured so that heat of the heater is transferred to all of the wall surfaces surrounding the substantially sealed space, and
the column holder has a rectangular shape, a longitudinal direction, and a recess along to the longitudinal direction, and the column holder holds the analytical column in the recess.

2. The column oven according to claim 1, further comprising an openable cover and a column oven main body that has an openable surface that is opened and closed by the openable cover, wherein
the column oven main body has a recess that opens on the opening surface side so that the analytical column is inserted into the recess from the opening surface side and is held in the recess, inner wall surfaces of the recess are constituted of the heat conductive material,
the openable cover includes a heat transfer plate constituted of the heat conductive material on a surface opposing the openable surface of the column oven main body, and
when the openable cover closes the openable surface of the column oven main body, the heat transfer plate seals the opening by coming into contact with an edge, constituted of the heat conductive material, of the opening of the recess so that the substantially sealed space is formed.

3. The column oven according to claim 2, wherein
the column holder is provided in the recess,
the column oven is configured so that heat of the heater is directly transferred from the inner wall surfaces of the recess to the analytical column through the column holder, and
the column oven is configured so that the analytical column is heated by convection of heat in the substantially sealed space by being transferred the heat of the heater from the inner wall surfaces of the recess to the heat transfer plate.

4. The column oven according to claim 2, wherein the openable cover has an elastic member keeping to press the heat transfer plate toward the openable surface.

5. The column oven according to claim 2, wherein one end of the openable cover is linked with the column oven main body by a hinge.

6. The column oven according to claim 1, wherein the column oven is configured so that the analytical column is heated by heat of the heater directly transferred to the analytical column from the one wall surface of the wall surfaces through the column holder and by convection of heat in the substantially sealed space.

7. A column oven comprising:
a substantially sealed space surrounded by wall surfaces made of a heat conductive material to accommodate an analytical column, all of the wall surfaces made of the heat conductive material coming into contact with each other;
a column holder provided in the substantially sealed space while being in thermal contact with one wall surface of the wall surfaces and configured to hold the analytical column by being in thermal contact with the analytical column, and a whole of the column holder being made of a heat conductive material,
a heater for heating the wall surfaces made of the heat conductive material while coming into contact with the wall surfaces; and
a heat insulating material surrounding an outside of the wall surfaces made of the heat conductive material, wherein
the column oven is configured so that heat of the heater is transferred to all of the wall surfaces surrounding the substantially sealed space, and
the heater is embedded in the one wall surface of the wall surfaces, and the column holder is in face-to-face contact with the one wall surface in which the heater is embedded.

* * * * *